July 7, 1970   W. H. SOLOMON   3,518,808
PACKAGING MACHINE ARTICLE RELEASE APPARATUS
Filed Oct. 4, 1968   5 Sheets-Sheet 1

INVENTOR.
WILLIAM H. SOLOMON
BY
ATTORNEYS

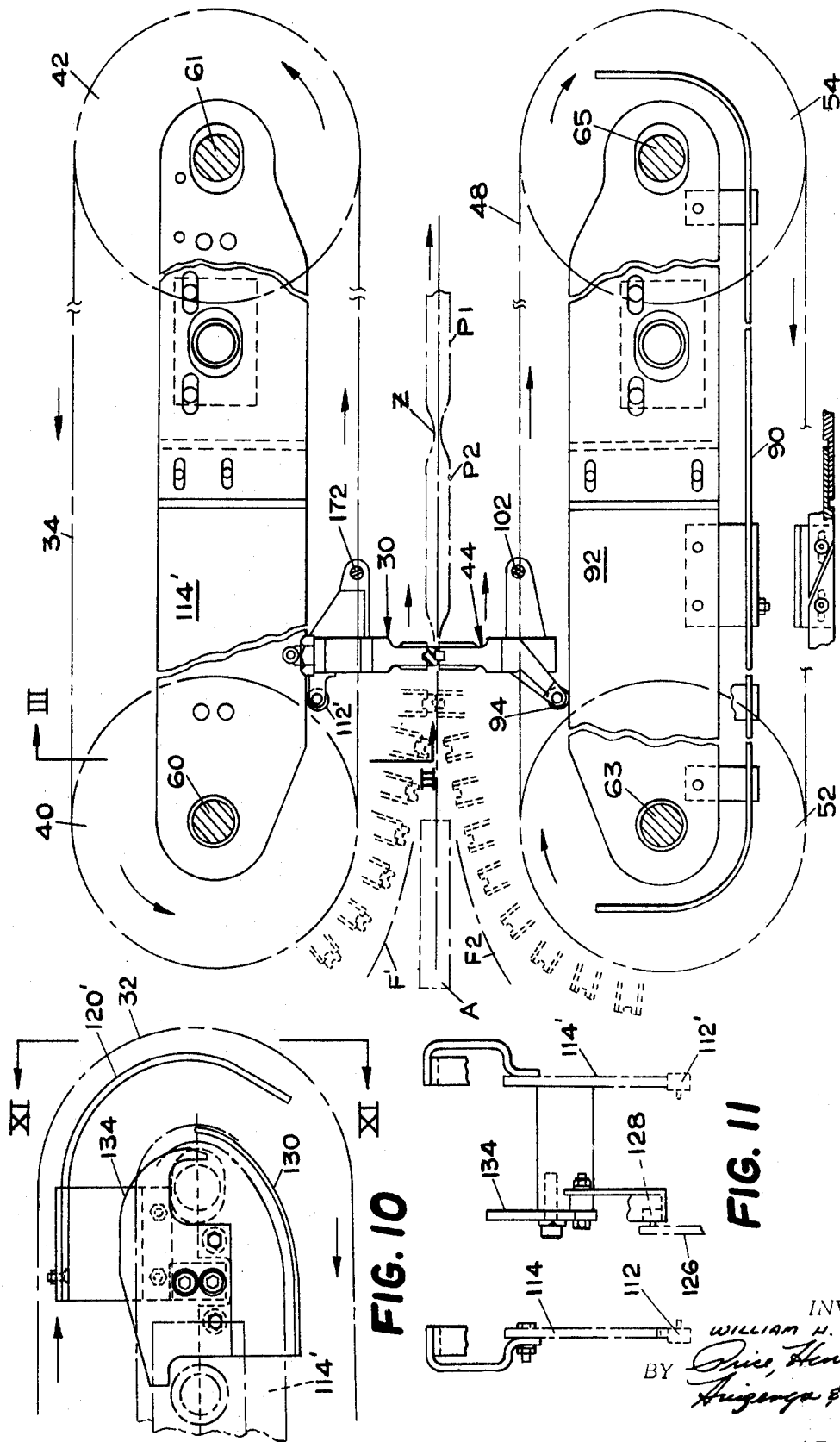

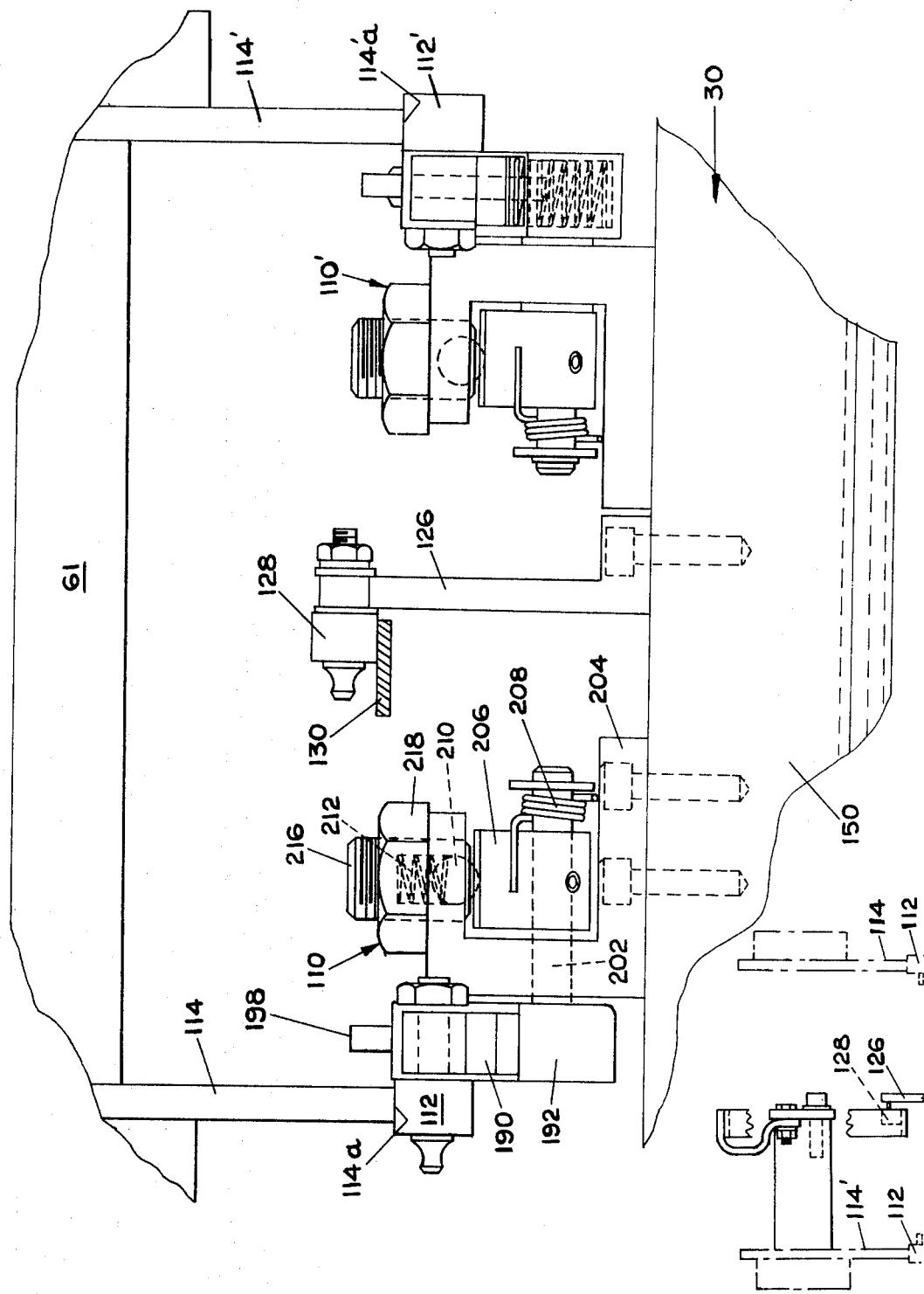

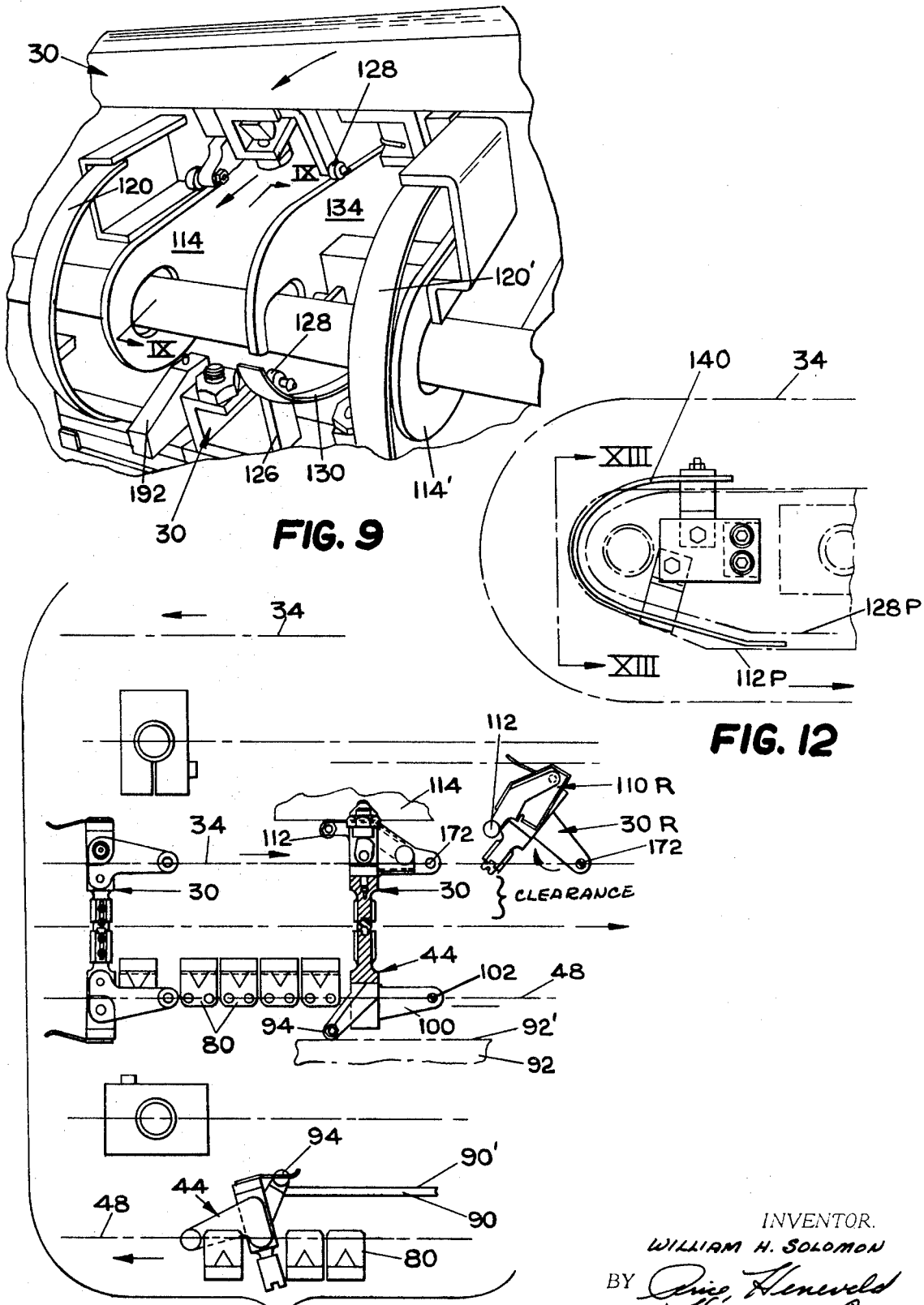

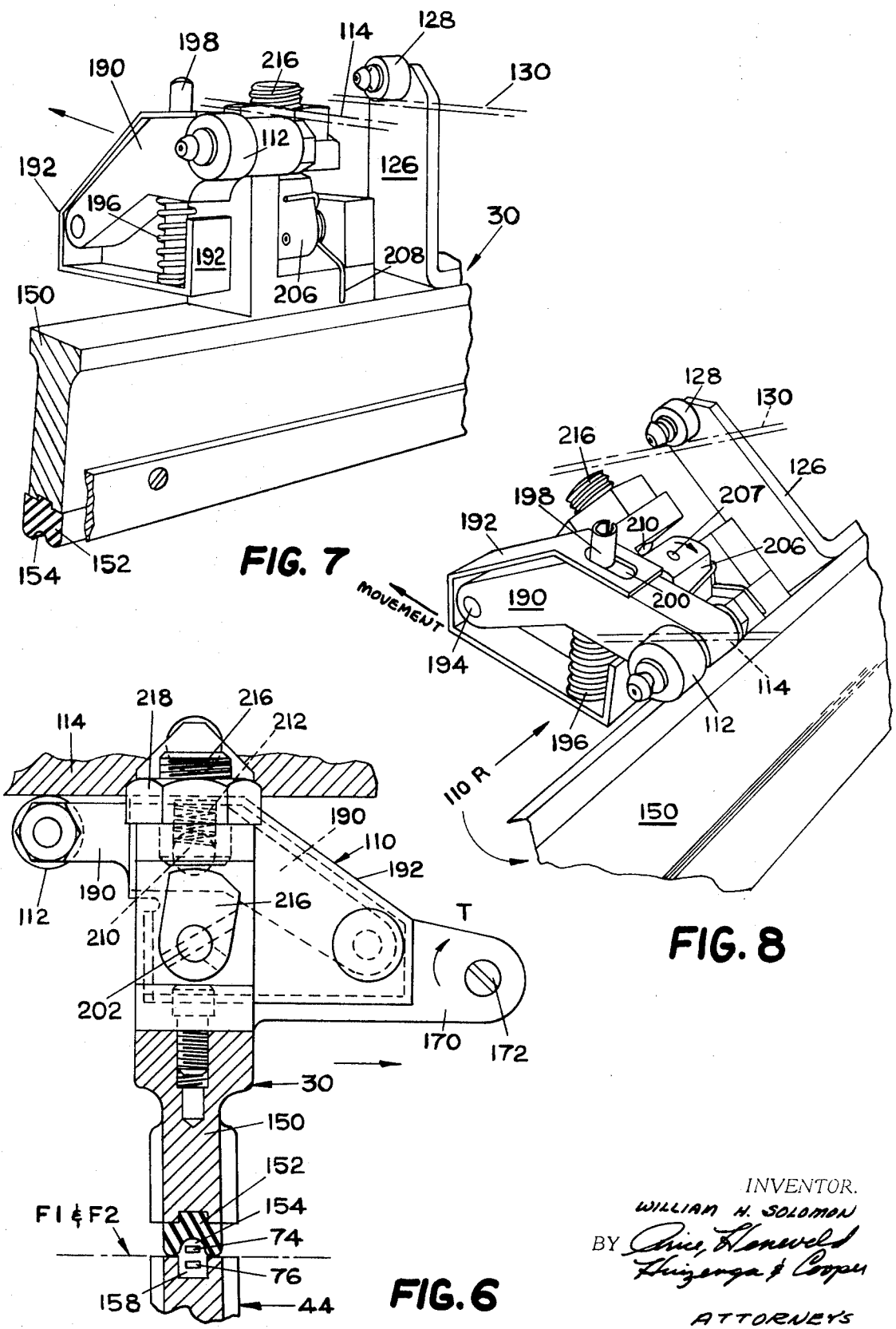

United States Patent Office 3,518,808
Patented July 7, 1970

3,518,808
PACKAGING MACHINE ARTICLE RELEASE APPARATUS
William H. Solomon, Grand Rapids, Mich., assignor to Oliver Machinery Company, Grand Rapids, Mich., a corporation of Michigan
Filed Oct. 4, 1968, Ser. No. 765,085
Int. Cl. B65b *57/10*
U.S. Cl. 53—77        11 Claims

ABSTRACT OF THE DISCLOSURE

Packaging machine with recirculating, continuous operation, cooperative upper and lower series of transverse sealer or fusion members, advanced in mutually engaged relation, with each one of at least one series of members, preferably the upper series, having special release mechanism releasable from engaged relation by torque force applied due to force applied rearwardly of the direction of fusion member advance or vertically thereof, to be self-clearing, prevent jamming of the machine due to mislocated objects, and to prevent potential personal injury.

BACKGROUND OF THE INVENTION

This invention relates to packaging apparatus, and more particularly to a packaging machine employing transverse web fusing members continuously advanced in cooperative mutually engaged relation, with means to automatically specially release such members out of said relation under certain conditions.

One type of available high speed packaging apparatus continuously packages articles at spaced intervals between a pair of continuous film members that are initially separate or are parts of a single film member folded over. The films are bonded together longitudinally along the opposite side edges and laterally across the films between the spaced articles. Such bonding may be achieved by a variety of techniques, including heat sealing with hot air or radiant heat, ultrasonic sealing, or the like. Although such equipment and techniques are capable of relatively high production rates due to the continuous manner thereof, too frequently the operation of the conventional form of this type apparatus is disrupted drastically by any mislocated object such as a poorly positioned article being packaged, a tool, a person's hand, or otherwise. When such an object happens to be between the cooperative sealer bar members as they move toward interengagement, or in the path of such members as they advance, the machine becomes jammed, frequently causing destruction of articles being packaged, damage to the machine, and/or injury to a person involved and interruption of production.

SUMMARY OF THE INVENTION

It is an object of this invention to provide a continuous packaging machine of the type that envelopes articles with portions of a pair of film members bonded longitudinally and laterally, but capable of continued dependable operation even though one or more of the articles being packaged is improperly positioned, even though foreign objects happen to be in the path of the sealer members, or something else should cause a force on the sealer member opposing their interengagement or their advancement. The apparatus is uniquely self-clearing.

The apparatus has in addition to longitudinal side sealing means, upper and lower recirculating, spaced, transverse sealing members which cooperate during the forward pass and then separate to follow a return pass. The transverse sealer members thus move into and out of mutually cooperative engagement with each other to bond the films at the front and rear of advancing articles, but will instantly release under a predetermined force caused as by an object between mutually approaching sealer members or under a predetermined force opposing advancement of the members, to prevent damage and/or inujry. The sealer members will be mutually engaged, under normal conditions, with a substantial force that enables effective bonding between the films, without release of the mechanism.

The recirculating members, whether released or not, are subsequently shifted into proper position during their return travel to again be functional upon reaching the advancing portion of their recirculating path. The sealer members are cam controlled to be properly positioned during forward advancement, using special cam and cam follower mechanisms.

These and other objects and features of the invention will become apparent upon studying the following specification in conjunction with the drawings.

BRIEF DESCRIPTION OF THE DRAWINGS

FIG. 2 is a partial, sectional, elevational view of the main components of the apparatus taken on plane II—II of FIG. 1;

FIG. 4 is a fragmentary enlarged view of the central portion of the apparatus in FIG. 3;

FIG. 5 is a fragmentary partial view of the central portion of the assembly in FIG. 2;

FIG. 6 is an enlarged fragmentary view of one pair of the cooperative sealer bar members in FIG. 5;

FIG. 7 is a perspective, enlarged, fragmentary view of the release mechanism forming part of the upper subassembly of the apparatus in FIG. 6, shown from the rear of the sealer bar, and with the bar in the unreleased condition;

FIG. 8 is a perspective view of the apparatus in FIG. 7, shown in the released condition;

FIG. 9 is a fragmentary perspective view of the discharge end of the apparatus in FIG. 1, showing the cam track structure;

FIG. 10 is a fragmentary elevational view of the cam track structure in FIG. 9, taken on plane IX—IX;

FIG. 11 is a partial, end elevational view of the cam track elements of the novel apparatus, viewed on plane XI—XI of FIG. 10, i.e. from the discharge end;

FIG. 12 is a fragmentary side elevational view of the infeed end of the apparatus, showing the cam track structure;

FIG. 13 is a fragmentary elevational view of the cam follower structure of the sealer bar members, viewed on plane XIII—XIII of FIG. 12 toward a retreating article.

DESCRIPTION OF THE PREFERED EMBODIMENT

Referring now specifically to the drawings, the packaging apparatus 10 comprises an elongated structure having a continuous, recirculating upper subassembly 12 and a continuous recirculating cooperative lower subassembly 14. These are supported by a suitable framework subassembly 16.

Figure 3:
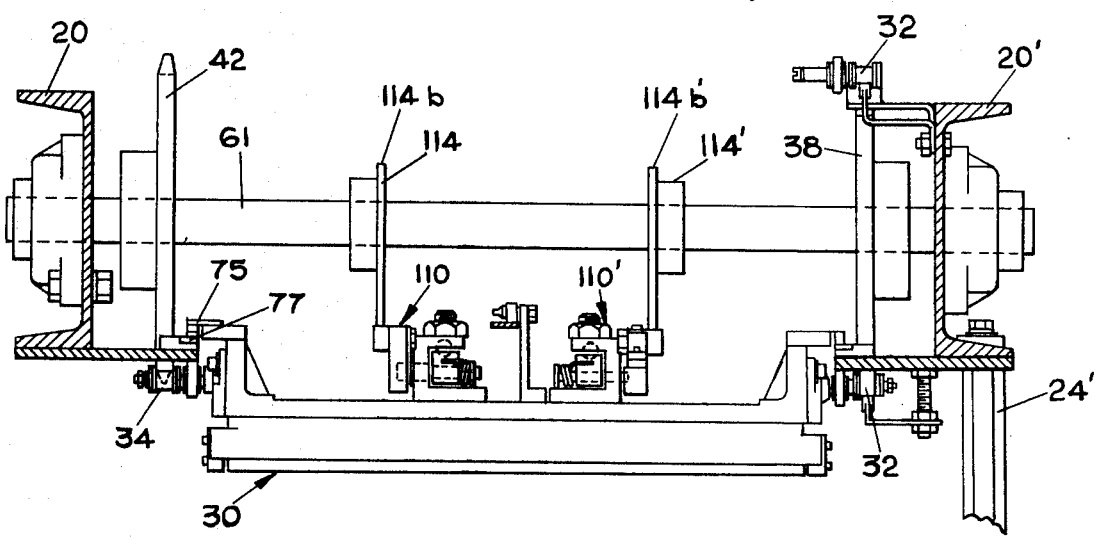
FIG. 3 is a sectional view taken on plane III—III of FIG. 2, showing the upper subassembly.

Framework 16 may include a pair of horizontally elongated supports 18 and 20 on one side of the apparatus, secured together by suitable tie members 22 and 24, and like apparatus on the opposite side, including support 20' (FIG. 3), tie member 24' and the like.

Upper subassembly 12 includes a plurality of transverse, spaced, elongated sealing bar members 30 mounted on their ends to a pair of like, continuous roller chains 32 and 34. Chains 32 and 34 each are mounted upon, driven by, and pass around a pair of sprockets located at opposite ends of the packaging machine. Specifically, chain 32 passes around sprocket 36 on the infeed end and sprocket 38 on the discharge end, while chain 34 passes around sprocket 40 on the infeed end and 42 on the discharge end.

Cooperative with the elongated upper sealer bar members 30 is a plurality of transverse, spaced, elongated sealer bar members 44 of the lower series. These lower ones have their opposite ends mounted to a second pair of like, continuous, recirculating roller chains, namely chains 46 and 48. Chain 46 passes around a pair of sprockets, including sprocket 50 at the infeed end of the apparatus, while chain 48 passes around a pair of sprockets including sprocket 52 at the infeed end and sprocket 54 at the discharge end. The sprockets are arranged with respect to each other so that the chains travel in the same pattern in parallel planes, i.e. chains 32 and 34, and chains 46 and 48. The adjacent sprockets are mounted on a common shaft, i.e. sprockets 36 and 40 on shaft 60, sprockets 38 and 42 on shaft 61, sprockets 50 and 62 on shaft 63, and sprockets 54 and 55 on shaft 65. The entire series of chains and sprockets for the upper and lower subassemblies are driven by suitable power means (not shown) such as an electrical motor, and are synchronized by being driven through interconnecting gears, specifically gear 62 for the lower subassembly, and gear 64 for the upper subassembly, these two being interconnected by intermediate gears 66 and 68.

In the specific embodiment of the novel apparatus illustrated, the unique release mechanism is only incorporated into each of the upper members 30 and not into the cooperative lower members 44. It will be realized that it could be incorporated into the lower members alternatively or also, but normally this is not necessary.

It is necessary that the lower and upper members cooperate in the fashion illustrated, for example in FIG. 2, for the packaging operation. These members are spaced equal amounts longitudinally of the apparatus, on the respective roller chains or other continuous drive members, and are synchronized to interengage when they approach each other during the forward pass of the apparatus, to subsequently part at the discharge end of the apparatus, and to be returned along the return outer passes.

During the operation of the packaging machine a pair of continuous elongated thermoplastic, heat-sealable films, F1 and F2 (FIG. 2) which are initially either completely separate or alternatively are overlapping portions of a folded film (so-called center folded) are fed into the machine astraddle a series of spaced interfed articles A (FIG. 2). The films F1 and F2 are purposely of greater width than the articles to overlap on the side edges which are then fused and usually sealed together by any suitable means 17 (FIG. 1) on one or both sides, depending upon whether they are initially separate or not such fusion being by radiant or conductive heat sealing, ultrasonic fusion, or the like equipment. Simultaneously with passage through the machine, the films are fused, and usually sealed transversely between the packages by the cooperation of transverse members 30 and 44. These grip the films and force them together, and include an activating fusing causing element such as an electrical resistance heater strips 74 and 76 (FIG. 6) supported by respective members 30 and 44 and positioned to be exposed immediately adjacent the films gripped between these members to fuse them together as the films and members and packages all move at the same rate through the machine. The approach of the members 30 and 34 into this cooperative relationship is illustrated by the sequential stages of one pair of these members in phantom lines at the left end of FIG. 2. A pair of these members fuses a transverse section Z of the film at the front and rear of each article to obtain packaged articles P1 and P2 etc. (FIG. 2).

Articles A when fed into the mechanism and when packaged as packages P1, P2, etc., are preferably supported between the transverse sealing members 30 and 44 by articulated package supports 80 (FIG. 5) mounted to and extending between lower chains 48 and 46, to travel with the chains and serve as a constant support to prevent the weight of the packages from stretching the films or webs into which the articles are being packaged.

In order to properly position mechanism 30 and 44 in their cooperative relationship, specific fixed cam track structures are employed on the machine to cooperate with cam followers on the travelling members. The cam and cam follower structures for lower members 44 are relatively simple. These include an elongated cam member 90 longitudinally of the machine along the lowermost return pass portion of the lower subassembly, having a cam track 90' to cooperate with a cam follower roller 94 on each member 44, and a second elongated cam member 92 (located adjacent the forward pass of the lower members 44 of the lower subassembly 14) and having an elongated cam track 92' cooperative with cam followers 94 to maintain members 44 in upright cooperative relationship with depending upper members 30, as members 44 are pulled along by chains 46 and 48.

The attachment of members 44 to the chains is through a pair of forwardly protruding bracket ears 100 on opposite ends of members 44, to make co-axial pivotal connections 102 to the respective roller chains. The components of upper subassembly 12 are much more complex in nature and function.

As noted earlier, upper gripping and bonding mechanisms 30 have a special release feature. Normally, these mechanisms 30 function in an unreleased condition, recirculating around the upper subassembly in a forward pass in cooperation with lower mechanisms 44 and then in a return non-functional pass while the lower subassembly members 44 do likewise.

More specifically, each of the upper transverse bonding or sealer bar mechanisms 30 includes at least one, and preferably two special release mechanisms 110 and 110' which are basically identical but mounted in mirror image fashion. The use of two such release mechanisms provides a more balanced action for the elongated bar member. Each of these release mechanisms includes a cam follower roller, 112 and 112' respectively, which, during the normal unreleased condition of the release mechanisms, cooperate with a pair of respective cam tracks 114 and 114' respectively, extending along the length of the apparatus. The lower surfaces of these cam track members form cam track surface 114a and 114'a while the device is in cooperative relation with the lower sealer bar members 44. During the return upper pass of upper members 30, upper cam track surfaces 114b and 114'b (FIG. 3) form cam track surfaces for followers 112 and 112'. The cam follower rollers 112 and 112' also cooperate at the discharge end of the apparatus (FIG. 9) with a pair of arcuate retainer cam tracks 120 and 120'.

In addition to the cam followers on the release mechanisms, each of mechanisms 30 also includes a rigid bracket 126 (FIG. 4) which projects away from the back edge thereof and has at its other end a cam follower roller 128 which engages the outer surface of a cam track 130 projecting along the length of the machine. Roller 128 engages track 130 which when mechanism 30 is in cooperative engagement with a lower mechanism 44. On the upper return pass of subassembly 12, cam follower 128 rides along elongated cam track 134 (FIG. 9) to retain the mechanism in an upright position. In addition, at the infeed end of the machine (FIGS. 1 and 12) is a supplemental cam track 140 generally arcuate in configuration to assist in the position of each mechanism 30 which is about to cooperate with a mechanism 44 to grip a pair of films F1 and F2.

Each mechanism 30 basically includes, in the preferred form, an elongated transverse rigid support 150 (FIG. 6) which has a resilient gripping member 152 along its outer functional edge, with member 152 including a central elongated recess 154 through which electrical radiant heating strip 74 or the like (FIG. 6) extends. Member 44 includes an elongated recess 158 which falls adjacent recess 154 and preferably normally contains another electrical radiant heating strip 76 so that heat can be applied to both exposed surfaces of the films. These obtain electrical energy through sliding contacts 75 (FIG. 3) riding on electrical bus strips 77 during a controlled time interval. Resilient element 152 squeezes the films tightly against member 44 to grip and advance the webs while the sealing action is occurring. The straddling type grip operation also retains the web in proper relationship so that it cannot distort during the fusion or bonding operation during advancement. Rigid support 150 has a pair of mounting bracket ears 170 projecting forwardly from its opposite ends, and pivotally mounted to roller chains at coaxial pivots 172 to be pulled along by the chains. The axis of pivots 172 is longitudinally offset from the plane of contact of mechanisms 30 and 44.

With each mechanism 30 in its normal non-released position, illustrated for example in FIGS. 5, 6, and 7, the engagement of rollers 112 and 112' against the underside track surface of cam tracks 114 and 114' maintains lower gripping edge 152 of members 30 in cooperative engagement with members 44. If an obstructive torque force of a predetermined amount is applied to any portion of structure 30, tending to rotate it about its pivotal attachment axis 172, it will release. Such a torque might be applied by a force tending to restrain forward movement of the mechanism or a vertical force applied to the main portion of rigid support 150. The first type of force might be occasioned by the encounter of mechanism 30 with a tool, package, or other object out of place in the equipment, thereby tending to apply a reverse thrust to it. The second type of force might be encountered by the occurrence of a package, a tool, a person's hand, or other object between mechanisms 30 and 44 as they approach each other for a cooperative gripping relationship on the webs or films. Such a resulting torque is illustrated by arrow T in FIG. 6, tending to rotate the structure in a clockwise direction as it is viewed in FIG. 6. This torque, when greater than a predetermined amount, causes the individual mechanism 30 to which it is applied to release and pivot in this direction of torque about pivot axis 172 as illustrated by released mechanism 110R in FIG. 5 and FIG. 8. This enables the individual sealer mechanism 30R (FIG. 5), to pivot rearwardly and create a clearance (FIG. 5), to enable mechanism 30R to continue advancing past the obstruction without damage to it or to the remainder of the machinery due to jamming, bending, or the like and without injuring an operator or the like.

Release of each control mechanism 110 is opposed during normal operation by a spring biased ball and detent assembly. More specifically, each release mechanism 110 has its cam follower roller 112 attached to a projcted end of an elongated link or finger-like element 190 (FIG. 8) pivotally attached at its opposite end 194 to a support shell member 192. This releasing pivotal movement is opposed by a compression spring 196 extending between finger 190 and lower portion of housing shell 192. This compression spring allows a minor amount of deflection of roller 112 and finger 190 before the release mechanism actually does release, thereby preventing it from releasing when a controlled film squeezing force is applied between mechanisms 30 and 44, yet enabling it to release in case of a serious obstruction. Pivotal movement of finger 190 on housing support 192 is limited, however, by the interfit of a stop pin 198 projecting from link 190 in an elongated slot 200 in housing member 192. If the torque applied to the unit is sufficient to not only compress spring 196 but also shift stop 198 generally the length of slot 200, further torque will cause rotation of housing support 192 and its pivot pin 202 (FIG. 4) to which it is secured. This pivot pin 202 is rotatably mounted by a fixed generally C-shaped mount 204 attached to the back edge of rigid member 150 of each mechanism 30. Affixed to the other end of this rotational pin 202 is a boss 206 biased by a torsion spring 208 to its upright position, and with a recess or detent 207 in its upper surface for ball 210 biased by a captured compression coil spring 212 inside hollow bolt 216. Release of this mechanism is therefore caused only by torque sufficient to cause boss 206 to rotate sufficinetly to disengage bail 210. The amount of compression of spring 212 can be adjusted by stud 216 in nut 218 (FIG. 6).

Figure 1:
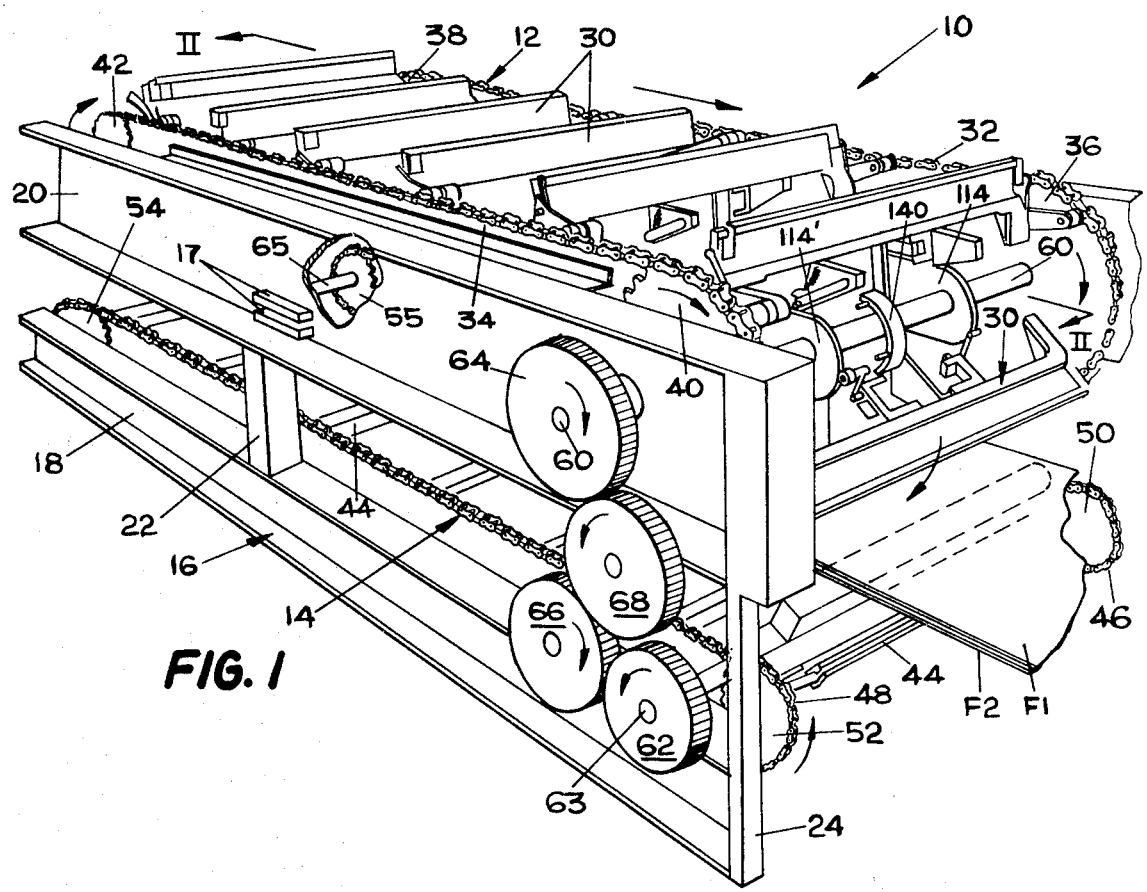
FIG. 1 is a perspective view of the packaging machine, viewed from the infeed end and showing both the upper and the lower subassemblies.

In operation, suitable power means drive gears 62, 64, 66, and 68 to cause upper and lower subassemblies 12 and 14 to operate synchronously, with each of the equally spaced mechanisms 30 on the upper subassembly corresponding to one of the equally spaced mechanisms 44 on the lower subassembly. A pair of films or webs F1 and F2 are fed into the infeed end of the machine (the left end as illustrated in FIG. 2 and the right end as illustrated in FIG. 1) as well as a plurality of articles A fed in normally or otherwise between the two webs at spaced intervals matching the spacing between the grippers. As the recirculating mechanisms 30 and 44 approach each other, they grip the two films F1 and F2 therebetween, and specifically between resilient element 152 on the lower edge of mechanisms 30, and the upper edge of mechanisms 44, so that the electrical resistance heater strips 74 and 76 are exposed to but not in contact with the opposite surfaces of the gripped films. A pair of these mechanisms 30 and 44 grips the film immediately ahead of the article and immediately behind each article so that, as the articles and films and mechanisms travel through the machine, the thermoplastic films are heated to a point of fusion which, due to the pressure between the gripping mechanisms, fuses and bonds, and preferably seals them together along the transverse lines relative to the direction of travel. Simultaneously, longitudinal sealing means 17 such as electrical heater elements, ultrasonic means, hot air, or the like seals both side edges of the continuous films F1 and F2, to completely envelope articles A into the form of packages P1, P2, etc. Obviously, the length of the apparatus, the rate of travel through the apparatus and the like can be governed to suit the particular film thickness, package size, and the like. Also, the particular spacing of mechanisms 30 and 44 along the roller chains can be varried to suit the size of the article.

As the mechanisms 30 and 44 reach the discharge end of the machine, they separate to independently move around the return pass as advanced along their respective chains, and release the packaged articles for separation into independent packages. As the mechanisms separate, they are maintained in their position generally perpendicular to the long dimension of the chains by cam tracks 120 and 120' (FIG. 9) which have arcuate inner surfaces that engage cam follower rollers 112 and 112' of release mechanisms 110 and 110' (FIG. 4). Simultaneously, cam follower roller 128 engages first the inner arcuate surface of cam track 130 and then the outer surface of cam track 134 (FIG. 9). These therefore control the mechanisms 30 of upper subassembly 12.

Moreover, if, during the passage of the mechanisms through the equipment, one or more has been released because of a torque applied due to an obstruction or the like, these particular cam tracks and cam followers just mentioned cause the released mechanism to move from its angular released position back to its reset position. Specifically, if one of the units is in the condition illustrated at 30R in FIG. 5 and FIG. 8, so that the sealing unit trails behind its mounting point at a diagonal, as it approaches the camming structure on the discharge end of the unit, its cam follower 128 engaging the inner arcuate cam track 130 along with engagement of the cam followers 112 and 112′ with cam track 120 and 120′, and then subsequent engagement of cam follower 128 with track 134, causes the unit to pivot about its pivotal mounting axis 172, in the opposite direction of the pivoting caused during the release function. Hence, the ball and detent device 206–210 is forced back into engagement in the reset position. The unit is then ready for another pass through the machine upon reaching the infeed end.

As it does reach the infeed end, cam tracks 114 and 114′ guide cam followers 112 and 112′, while inner arcuate cam track 140 guides cam follower 128 so that these members are kept normal to the path and follow the paths indicated by the phantom lines 112P and 128P respectively in FIG. 12.

The lower mechanisms 44 are guided in their movement by engaging of their cam followers 94 with upper cam track 92 during the packaging function, and on the return pass, by cam track member 90.

The important release feature prevents the machine from being seriously damaged, prevents shutdown during operation due to the presence of an obstruction or an accidental temporary difficulty, with each of the mechanisms responding independently to such an obstruction, and each being reset automatically as the unit reaches the discharge end and returns on the return pass to the infeed end of the conveyor. It is conceivable that the particular details of mechanism used to embody this release feature, as well as the reset cam and cam track structures may be modified to suit a particular type of installation or situation. It is also realized that several additional advantages not specifically recited may well be apparent to those in the art upon studying this disclosure. The concept believed to be unique in this assembly is set forth in the claims attached.

The embodiments of the invention in which an exclusive property or privilege is claimed are defined as follows:

1. Apparatus for bonding a pair of films together at intervals, comprising: a first series of a plurality of film engaging members; first recirculatory conveyance means supporting said members at intervals and adapted to propel said members through an advance travel and a return travel: a second series of a plurality of film engaging members; second recirculatory conveyance means supporting said second series members through an advance travel and a return travel; said first series members and second series members having film engageable portions and being mutually cooperative in pairs to engage a pair of films therebetween; the members of at least one of said series having release means responsive to a predetermined force applied thereto to release and allow such members to shift out of said mutually cooperative condition.

2. Apparatus for gripping films at spaced intervals, including first and second series of cooperative conveyed film engaging members shiftable in pairs into mutually cooperative film engaging relationship therebetween, and at least one of said series of members including release means responsive to a predetermined force caused by an obstruction force to shiftably release from said relationship.

3. The apparatus of claim 1 wherein said members are pivotally mounted on pivot axes transverse to their direction of travel and offset in the direction of travel from said film engaging positions thereof, to thereby be releasably responsive to force tending to restrain advancement of said members and to excessive force between the pairs of members of said first and second series.

4. The apparatus in claim 1 wherein said release mechanisms each include means arranged to normally apply a film squeezing force between said pairs of advancing members without release of said release mechanisms.

5. The apparatus of claim 2 wherein said release means each include spring biasing means arranged to normally apply a film squeezing force between said pairs of advancing members.

6. The apparatus of claim 5 wherein said release mechanisms include detent means biased to release with occurrence of predetermined obstructive force.

7. The apparatus in claim 3 including cam followers on said release means, and cam track means positioned to reset any released members and to position said members for said advance travel.

8. The apparatus in claim 2 including first and second recirculatory conveyance means; said first and second series of members each being respectively pivotally mounted on said conveyance means on pivot axes transverse to their direction of travel, to thereby be releasably responsive to forces tending to restrain advancement of said members and to excessive forces between the pairs of members of said first and second series.

9. The apparatus in claim 8 including cam followers on said release means, and cam track means positioned to reset any released members and to position said members for said advance travel.

10. The apparatus in claim 2 constituting packaging apparatus having side edge film bonding means, and transverse film bonding means at said members, to bond said films around articles placed between said members.

11. The apparatus in claim 2 wherein said release means includes ball and detent means.

References Cited

UNITED STATES PATENTS 3,220,156  11/1965  Hart et al. _____ 53—77
3,405,501  10/1968  Edelberg et al. _____ 53—77 X TRAVIS S. McGEHEE, Primary Examiner U.S. Cl. X.R.

53—180; 156—326, 564